United States Patent [19]

Parker

[11] Patent Number: 4,911,984

[45] Date of Patent: Mar. 27, 1990

[54] LAMINATED GLAZING UNIT

[75] Inventor: Anthony A. Parker, Toledo, Ohio

[73] Assignee: Libbey-Owens-Ford Co., Toledo, Ohio

[21] Appl. No.: 373,678

[22] Filed: Jun. 28, 1989

Related U.S. Application Data

[63] Continuation of Ser. No. 34,837, Apr. 6, 1987, abandoned.

[51] Int. Cl.⁴ .................. B32B 17/10; B32B 27/30
[52] U.S. Cl. .................. 428/428; 428/429; 428/430; 428/448
[58] Field of Search .......... 428/426, 428, 429, 430, 428/436, 448, 451

[56] References Cited

U.S. PATENT DOCUMENTS

| | | | |
|---|---|---|---|
| 3,388,035 | 6/1968 | Mattimoe et al. | 428/447 X |
| 4,112,171 | 9/1978 | Motter et al. | 428/447 X |
| 4,204,025 | 5/1980 | Le Grand et al. | 428/447 X |
| 4,204,026 | 5/1980 | Le Grand et al. | 428/447 X |
| 4,230,769 | 10/1980 | Goossens | 428/447 X |
| 4,277,538 | 7/1981 | Beckmann et al. | 428/447 X |
| 4,511,627 | 4/1985 | Tanuma et al. | 428/447 X |
| 4,599,274 | 7/1986 | Ando et al. | 428/447 X |

FOREIGN PATENT DOCUMENTS 186787  7/1986  European Pat. Off. .

*Primary Examiner*—Nancy A. B. Swisher
*Attorney, Agent, or Firm*—Marshall & Melhorn

[57] ABSTRACT

A laminated glazing unit composed of an improved polymer interlayer composite interposed between two glass sheets and its method of manufacture are disclosed. The improved interlayer contains various layers with appropriate thicknesses of silane primer, poly(ethylene vinyl acetate) and poly(ethylene terephthalate) arranged and bonded together in a particular fashion to increase the fragment retention capabilities of the laminated glazing while also improving the overall penetration resistance and safety characteristics of the structure without increasing the rigidity to a point where it poses a safety threat to the occupant.

14 Claims, 1 Drawing Sheet

LAMINATED GLAZING UNIT

This application is a continuation of application Ser. No. 034,837, filed Apr. 6, 1987, now abandoned.

BACKGROUND OF THE INVENTION

1. Field of the Invention

This invention is directed to improvements in impact resistant interlayer components for laminated glazing units. More particularly, the invention is directed to an alternative composite interlayer for the widely used interlayer material polyvinyl butyral in automotive windshields, sidelights, architectural glass and security glass, and to its method of manufacture.

2. Description of the Prior Art

Laminated glazing units, as employed in the windshields of automobiles, are generally produced by integrally bonding two sheets of glass to an interposed layer of plastic. Almost universally the plastic interlayer material employed is polyvinyl butyral. However, such resins are thermoplastic and have several drawbacks when used as an intermediate layer.

The surface of plasticized polyvinyl butyral film is very tacky and presents a problem of handling, often requiring storage and transport at low temperature. These difficulties arise primarily because of the presence of plasticizer in the polyvinyl butyral film. In practice, the degree and type of plasticization has to be carefully chosen so as to give the best compromise between ease of manufacture of the laminated glazing units and the properties of the laminated glazing unit after manufacture. Further, the moisture content of the plasticized polyvinyl butyral interlayer must be carefully controlled if satisfactory laminated glazing units are to be manufactured.

The difficulties associated with plasticized polyvinyl butyral and the public's increasing concern for a safer laminated glazing unit have le to many attempts over a long period of time to provide a more convenient and improved laminated glazing unit. For example, U.S. Pat. No. 4,427,743 to Katsuki et al shows a plastic sheet and a glass sheet bonded to each other through an adhesive layer of a thermoplastic resin containing no plasticizer. The adhesive layer minimizes the strain attributed to he difference in the coefficient of thermal expansion between the glass sheet and the plastic sheet. One possible adhesive mentioned is a copolymer of vinyl acetate and ethylene.

However, copolymers of ethylene and vinyl acetate suffer a loss of adhesiveness when applied directly to a glass substrate. Therefore, the laminated glazing units so produced do no possess sufficient retention of adhesiveness of the glass substrate to meet modern requirements for fragment retention. In addition, the impact resistance of the Katsuki et al glazing unit is derived from the thickness of the plastic sheet. However it is known as the thickness of the plastic sheet increases the rigidity and hence the safety of the glazing unit decreases.

U.S. Pat. No. 4,511,627 to Tanuma et al shows a sandwich glass comprising glass plates and an intermediate layer interposed therebetween. The intermediate layer is formed by crosslinking or photocrosslinking a resin composition comprising an ethylene vinyl acetate copolymer and an organic peroxide or a photosensitizer. However, the sandwich glass produced in accordance with the teaching of Tanuma et al does not possess the superior penetration resistance of the present invention.

SUMMARY OF THE INVENTION

It is the primary object of the present invention to provide an improved laminated glazing unit.

Another object of the invention is to provide an improved composite interlayer interposed between two sheets of glass that provides higher penetration resistance than its commercially accepted counterpart.

It is another object of he invention to provide an improved composite interlayer that provides high impact resistance as a result of increasing the thickness of a reinforcing polyester layer to a specified level.

It is another object of the invention to provide an improved composite interlayer that exhibits low haze, high clarity, and excellent impact resistance at room and low temperatures.

It is another object of the invention to provide individual components of a glazing unit capable of lamination at lower temperature resulting in higher adhesive levels between the individual components than its commercially accepted counterpart.

It is another object of the invention to provide an optimum degree of adhesion between the polymer layers and the glass sheet layers to obtain a laminated glazing unit possessing an acceptable level of fragment retention capability.

It is a further object of the invention to provide a method of producing an optically transparent impact resistant composite interlayer bonded to two pieces of glass.

Still another object of the invention is to incorporate materials in, and employ procedures for, producing such glazing units that will ensure the resulting units will meet the exacting standards of appearance, safety, utility, and commercial practicability required in present day automobiles.

Other objects and advantages of the invention will become more apparent during the course of the following description when taken in connection with the accompanying drawings.

In accordance with this invention, the objects and advantages of this invention are achieved by producing a laminated glazing unit comprising an improved interlayer composite material integrally bonded between two glass sheets, said interlayer composite material comprising several, stacked and bonded individual layers including a central core sheet or film material of poly(ethylene terephthalate), a sheet or film material of poly(ethylene vinyl acetate) abutting and integrally bonded to each exposed surface of the poly(ethylene terephthalate) sheet or film material, and a sheet or film material of a silane primer abutting and integrally bonded to each exposed surface of poly(ethylene vinyl acetate) sheet or film material. In another embodiment of the invention said interlayer material composite comprises a central sheet or film material of poly(ethylene terephthalate) and sheet or film materials of poly(ethylene vinyl acetate) impreganted with a silane primer abutting and integrally bonded to each exposed surface of the poly(ethylene terephthalate) sheet or film material.

According to another aspect of the invention, the improved laminated glazing unit is produced by assembling into a stacked superimposed relationship an improved interlayer composite material interposed between two glass sheets, said interlayer composite material including a central core sheet or film material of poly(ethylene terephthalate), sheet or film materials of poly(ethylene vinyl acetate) abutting each expose surface of the poly (ethylene terephthalate) sheet or film material, and film materials of a silane primer abutting each exposed surface of the poly(ethylene vinyl acetate) material. Alternately, the interlayer material composite comprises a central sheet or film material of poly(ethylene terephthalate) and sheet or film materials of poly(ethylene vinyl acetate) impregnated with a silane primer abutting each exposed surface of the poly(ethylene terephthalate) sheet or film material. Air is then evacuated from between the stacked top layer of glass, the central composite interlayer and the bottom layer of glass. Next, the evacuated stacked assemblage is subjected to heat and pressure to effect the bonding of the various layers. Maintaining pressure on the assemblage, the laminated glazing unit is cooled. Finally, the compressive forces are released resulting in an optically acceptable, economically efficient laminated glazing unit with the improved qualities of increased penetration resistance at ambient and low temperature, low haze and high clarity.

DESCRIPTION OF THE PREFERRED EMBODIMENTS

Figure 1:
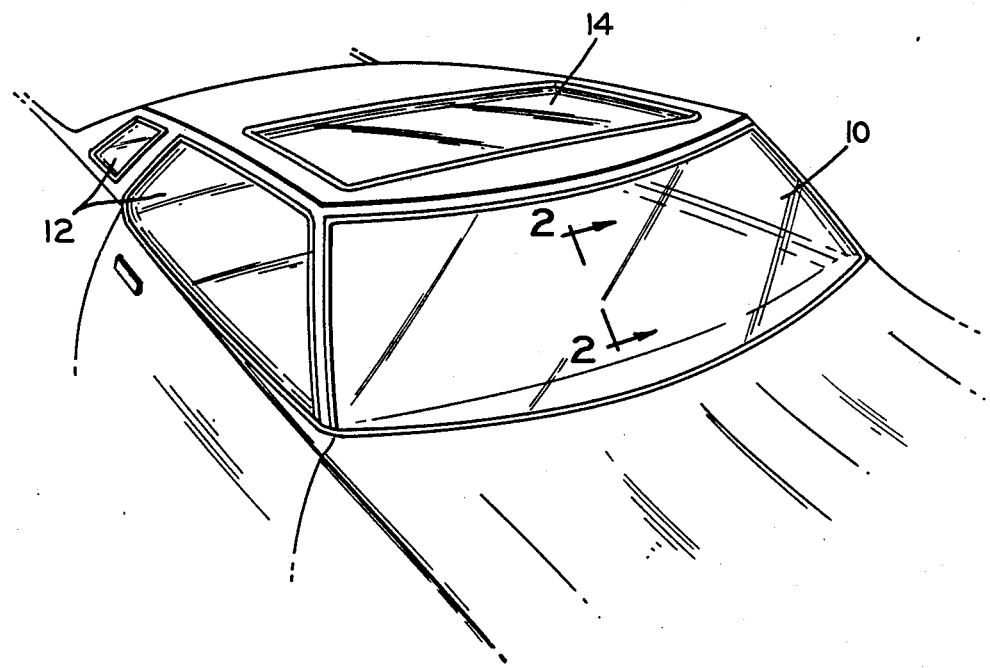
FIG. 1 is a perspective view of the front end of an automobile equipped with a sun roof, windshield and side lights, all produced in accordance with the invention.

FIG. 1 illustrates various types of laminated glazing units of the present invention. In particular, a windshield 10, side windows 12 and sunroof 14 made in accordance with the present invention, are shown.

Figure 2:
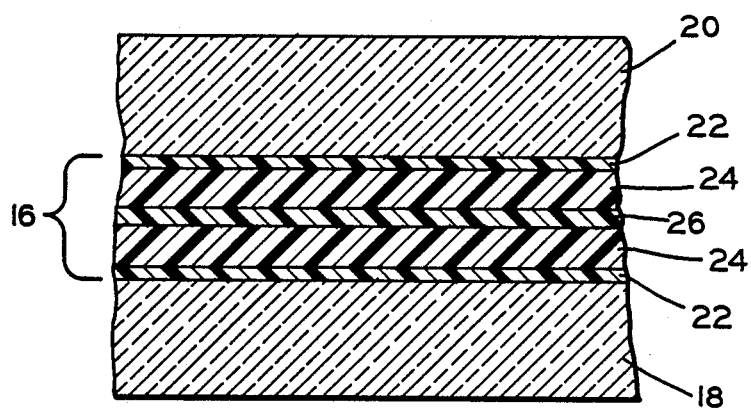
FIG. 2 is an enlarged sectional view taken along the line 2—2 of FIG. 1.

Referring to FIG. 2, a cross-sectional view of a typical laminated glazing unit embodying the present invention is disclosed. Typically, an improved interlayer material composite 16, is integrally bonded between two sheets of glass, 18 and 20. The improved interlayer material 16 is comprised of several sheet materials or films that combine and work synergistically to provide an improved impact resistant laminated glazing unit. More particularly, the interlayer 16 is comprised of a central polymer film or sheet material 26 of indentation resistant plastic such as poly (ethylene terephthalate), hereinafter referred to as PET, an adhesive and impact absorbing film or sheet material 24 of poly(ethylene vinyl acetate), hereinafter referred to as EVA, bonded to each exposed surface of said central film or sheet material of PET, and films 22 of a suitable silane primer bonded to each exposed surface of film or sheet material of EVA and to the glass sheets.

In an alternate embodiment of the invention, said interlayer material composite 16 comprises a central sheet or film material 26 of PET and sheet or film materials 24 of EVA impregnated with a silane primer.

It will be appreciated that the polymer composite interlayer films or sheet materials may be known and, in some cases, are available commercially. However, when these materials as individual components are combined and used in the manner contemplated by this invention, and employing the procedures described, surprisingly new, useful and unexpected results are obtained.

Use of commercially available components in the laminated glazing unit offers increased economic savings in material cost and processing and handling of the components to produce a finished product. In addition, the process of producing the laminated glazing unit employing readily available components affords flexibility in the thickness adjustment of the individual layers by merely stacking several layers of an individual component until a desired thickness is obtained and then placing the component in the appropriate location in the stacked interlayer forming the composite. An additional advantage in the use of commercially available components is that the composite interlayer may be prepared by melt laminating either by extrusion, or kiss laminating the commercially available EVA layers to the commercially available PET layer prior to placing the interlayer between the two sheets of glass forming the laminated glazing unit.

However, materials provided in other than film or sheet material form, from a commercial source, may be used in the laminated glazing unit. An example is a material in pellet form. The pellet form material may be converted to sheet or film form, by conventional press-molding, extrusion, callendering and hot-plate heating techniques, known in the art, and then employed in a fashion similar to the conventional sheet material previously described.

The specific glass types and thicknesses of all of the various components of the laminated glazing unit may be varied. The glass layers of the glazing structure may be in sheets that vary from 0.060 inch up to 0.090 inch and beyond in thickness. The PET layer of the composite interlayer structure 16 may be varied from 0.004 inch up to 0.007 inch and the EVA layer thickness may be varied from 0.012 inch up to 0.018 inch and beyond. A suitable silane primer typically has a thickness of 500 angstroms, but the thickness may be varied as long as the silane primer provides an adequate level of adhesion at the polymer-glass interface. While the ranges in thickness of the various polymer layers are intended solely as examples of optimum ranges, it will be appreciated that the ranges may be increased or decreased so long as the adhesion levels between the various layers are maintained within acceptable ranges. Specifically, the acceptable EVA/glass adhesion range is from 2.0 to 60 lbs/in. and beyond and an acceptable EVA/PET adhesion level is 2.0 to 60 lbs./in. and beyond. All adhesive levels, reported as the average peel force per width of sample peeled, were measured by the use of an Instron 4201 instrument manufactured by Instron Corporation at a peel rate of 2 inch/min. and at a 90° peel angle. The present invention, employing a multiple of thin layers within acceptable thickness ranges, attains an acceptable safety value and adhesion value at the interfaces while maintaining commercial practicability. Also, the glass in the present invention, as well as the PET layer, may be tinted, colored, rendered phototropic or otherwise provided with a means for filtering light.

According to one preferred embodiment of this invention, a layer 26 of poly(ethylene terephthalate) 26 of a character sold by duPont under their trademark "Mylar" or by Celanese under their trademark "Celanar" or as obtained from ICI under the designation Mellinex-516, is employed in the interlayer in a specific thickness range. The layer of poly(ethylene terephthalate), by reason of its inherent tensile response to high rates of elongation or stress, contributes to the penetration resistance of the structure and the passage of the cold test for the glass-interlayer glazing. Thus, a layer of poly(ethylene terephthalate) in a specific thickness range, exhibits good low temperature performance and serves as an indentation resistant plastic layer of the laminated glazing unit. The specific thickness range of the PET layer has been found to be of critical importance. It has been found that as the thickness of the PET layer is increased there is a corresponding increase in impact resistance of the laminated glazing unit. However, it has also been found that if the PET layer thickness is increased much beyond 0.007 inch the PET layer in the laminated glazing unit exhibits such rigidity that a possible safety problem exists, while a PET layer below 0.004 inch imparts inadequate rigidity to the laminated glazing unit resulting in an easily penetrable unit. Therefore, it is critical for safety and commercial utility reasons that a PET layer between 0.007 inch and 0.004 inch be employed in the composite interlayer.

It must be appreciated that the desired adhesion level at the PET interfaces may be assured by subjecting the PET surfaces to a surface conditioning treatment, which may be carried out electrically, chemically or by direct contact with a gas flame.

In the interlayer, the EVA component 24 may be said to function primarily as an adhesive, but it also acts in combination with the other layers to absorb the force of impact and, because of its elasticity and flexibility, to assist in resisting penetration by an object thrown against the laminated glazing unit. Furthermore, EVA having the improved quality of flexibility at low temperatures coupled with the good low temperature performance of PET, results in a laminated glazing unit having an overall high impact resistance at low temperatures.

One EVA material that has been found suitable for use in accordance with the invention in the interlayer composite is obtained commercially from Springborn Laboratories, Inc. under the designation #15295 unmodified fast curing EVA. This polymer is formulated with a peroxide curing agent. However, slow curing EVA films may also be employed. The peroxide curing agent serves to break-up crystalline regions of most ethylene copolymers that result from the orientation of the ethylene segment of the copolymer and also improves the low and high temperature properties of the EVA composite material. As a result of the decrystallization, the haze of the EVA interlayer component 2 is markedly reduced. In addition, the peroxide curing agent enhances crosslinking of the EVA component thereby greatly increasing the strength of the EVA layers.

In producing the laminated glazing unit, the EVA component layer 24 does not form a strong bond to glass which results in the bond cohesively failing. Thus, a primer may be applied to the interface between the glass surface and the EVA surface or may be incorporated into the EVA resin formula to increase the adhesive bond. The high adhesive levels serve to retain glass fragments of the laminated glazing unit that result from breakage thereof by impacting objects thus resulting in increased safety. One suitable primer is a silane primer 22 which may be flow coated, sprayed, brushed or dipped on to the bottom surface o the top glass sheet 20 and on to the top surface of the bottom glass sheet 18. The silane primer 22 is then allowed to dry on the glass surface to form a thin layer of active primer. Alternatively, the primer may be bonded to the EVA film or sheet material by mixing the silane primer with EVA resins before producing the film or sheet material of EVA.

A preferred epoxy based silane primer is gamma-glycidoxypropyltrimethoxysilane of ½ percent to 2 percent by weight concentration in isopropanol. As an alternative, the concentration of the epoxy based silane primer may be varied by mixing the epoxy based silane primer with isopropanol or mixing the hydrophylic primer with isopropanol or mixing the hydrophylic gamma-glycidoxypropyltrimethoxysilane with a suitable hydrophobic silane such as octadecyl triethoxysilane, to obtain a concentration range of ½ percent to 2 percent epoxy based silane primer. In addition, a mix of a hydrophylic primer and a hydrophobic primer has ben found to increase the moisture resistance of the overall laminate structure. However, in lieu of the preferred gamma-glycidoxypropyltrimethoxysilane, other silane primers including 1% beta-(3, 4 epoxy cyclohexyl) ethyl trimethoxy silane or 3-methacryloxypropyltrimethoxysilane may be employed so long as the adhesive qualities are regulated by the silane primer so as to obtain a level of adhesion between the various layers that will facilitate in the retention of glass fragments during impact, and simultaneously provide good impact resistance under varying environmental conditions.

As the adhesive quality between the interlayers is increased, the amount of loose flying glass from collisions with objects thrown at the laminated glazing unit is decreased, and the penetration resistance of the laminated glazing unit through cohesive failure within the EVA resin layer and additional energy absorbing mechanisms including some delamination, is increased. However because the impact resistance is independent of adhesion level the primary energy absorbing mechanism is not interracial delamination, but cohesive failure within the EVA resin layer. Adhesion levels adequate for glass fragment retention in the laminated glazing unit of the invention was found to be approximately 10.0 lbs./in., but may be varied from approximately 2.0 lbs./in. to 60.0 lbs./in. Similarly, the degree of adhesion between the EVA surfaces and the PET surfaces was found to be approximately 4.0 lbs./in., but may be varied from 2.0 lbs./in. to 60.0 lbs./in depending on the treatment of the PET surface. Simultaneously, an additional energy absorbing mechanism is derived from the combined thicknesses of the aforementioned layers as they act to absorb and dissipate the energy from impacting objects.

In a preferred embodiment, it has been found that when 2% gamma-glycidoxypropyltrimethoxysilane (Union Carbide's A-187 primer) in isopropanol is used as a primer between the glass interface and the EVA film or sheet material a laminated glazing unit with high penetration resistance at relatively low temperatures results. The increased bond strength between the glass sheet and EVA film or sheet material results in a glazing unit that fractures radially and uniformly. Laminated glazing units not primer treated are found to fracture, from impact by an object, into large and loose glass segments which can initiate tears in the PET component, and can also result in a safety hazard to the occupant.

The integrity of the bond between the EVA film or sheet material and the glass sheet and the thickness of the EVA film or sheet material serves to protect the PET component from tearing from the force of impact from an object. Hence, the laminated glazing unit derives its improved penetration resistance from the synergistic effect of the combination of the qualities of the above described components.

After the desired thicknesses of the individual components are obtained in a stacked relationship and interposed between two sheets of glass, 18 and 20, the composite is shot into an air autoclave for lamination. However, other techniques of lamination may be employed, such as a laminating press.

The composite may be heated for approximately 10 to 30 minutes at a temperature from about 260° F. to 300° F. and a pressure of approximately 200 psi to 250 psi. The time, temperature and pressure exposure of the composite in the laminating device must result in a sufficient curing of the various plastic layers and sufficient adhesive levels at the various interfaces. The laminated assembly is then removed from the laminating device and allowed to cool.

Optical tests were then conducted on the finished high impact resistant laminated glazing unit to determine the percent haze and percent transmittance values. In addition, the 5 lb. ball drop test add peel test were conducted on the laminated glazing unit that confirmed the increased impact resistance of the laminated glazing unit.

The following Examples illustrate the present invention in greater details. It should be understood that these examples are intended for illustrative purposes, and do not in any way limit the scope of the present invention.

EXAMPLE I

A laminate of a type for use in windshields was made by using a readily available polymer sheet material of poly(ethylene terephthalate) (Mellinex-516 polyester film produced by ICI) of 0.007 inch thickness. Two separate adhesive layers of 0.018 inch thickness poly(ethylene vinyl acetate) (composed of approximately 70% by weight ethylene and approximately 30% by weight of vinyl acetate) were provided adjacent each opposing surface of the poly (ethylene terephthalate) sheet material. Next, two glass sheets 0.090 inch in thickness that had been wiped on a single side with 2% gamma-glycidoxypropyltrimethoxysilane (Union Carbide's A-187) primer in an isopropanol solution to obtain a layer thickness of approximately 500 angstroms were placed against the opposing exposed exterior surfaces of the two adhesive layers of poly(ethylene vinyl acetate) to form a final composite of glass, A-187 primer, poly(ethylene vinyl acetate), poly(ethylene terephthalate), poly(ethylene vinyl acetate), A-187 primer and glass.

The aforementioned glass, composite interlayer, glass assembly was then laminated in an air autoclave at a temperature of 295° F. at 225 PSI for 25 minutes.

The resulting laminate was tested for impact strength, adhesive level at the polymer/glass interface, optical haze and light transmittance at a temperature of approximately 70° F. The optical property tests showed a laminate with a haze value of less than 1% and percent transmittance of above 80%. The impact strength test using a 5 lb. ball drop test on a 12 inch by 12 inch laminate sample showed a support height above 25 feet. The adhesive level at the polymer/glass interface was found to range from approximately 21 lbs./in. to 15 lbs./in. The composite laminate comprised of an interlayer composed of sandwiched layers at the thicknesses described in this embodiment of the invention exhibited an impact resistance superior to that of any previously tested composite laminates.

EXAMPLE II

A laminate of a type for use in windshields consisting of identical components and employing laminating conditions as described in Example I was tested for impact strength, optical haze, degree of adhesion at the polymer/glass interface and transmittance at a temperature of approximately 0° F. The optical property tests revealed a laminate with a haze value of less than 1% and percent transmittance of above 87%. The impact strength test, using the 5 lb. ball drop test on a 12 inch by 12 inch laminate sample, showed a support height of approximately 15 feet. The adhesive level at the polymer/glass interface was found to peak at approximately 75 lbs./in. The fragment retention quality of the laminate was still good at low temperatures.

EXAMPLE III

A laminate of a type for use in windshields was made by using a readily available polymer sheet material of poly(ethylene terephthalate) (Mellinex-516 polyester film produced by ICI) of 0.007 inch thickness. Two separate adhesive layers of 0.012 inch thickness poly(ethylene vinyl acetate) (composed of approximately 70% by weight ethylene and approximately 30% by weight of vinyl acetate) were provided adjacent each opposing surface of the poly(ethylene terephthalate) sheet material. Next, two glass sheets of nominal 0.090 inch thickness that had been wiped on a single side with 2% gamma-glycidoxypropyltrimethoxysilane (Union Carbide's A-187) primer in an isopropanol solution to a thickness of approximately 500 angstroms were placed against the opposing exposed exterior surfaces of the two adhesive layers of poly(ethylene vinyl acetate) to form a final assembly of glass, A-187 primer, poly(ethylene vinyl acetate), poly(ethylene terephthalate), poly(ethylene vinyl acetate), A-187 primer and glass.

The aforementioned glass, composite interlayer, glass assembly was then laminated in an air autoclave at a temperature of 295° F. at 225 PSI for 25 minutes.

The resulting laminate was tested for impact strength, adhesive level at the polymer/glass interface, optical haze and light transmittance at a temperature of approximately 70°. The optical property tests showed a laminate with a haze value of less than 1% and percent transmittance of above 89%. The impact strength test using a 5 lb. ball drop test showed a support height above 23 feet. The adhesive level at the polymer/glass interface was found to peak at approximately 21.0 lbs./in. The laminate tested exhibited an impact resistance superior to that of any previously tested laminates.

EXAMPLE IV

A laminate of a type for use in windshields was made by using a readily available polymer sheet material of poly(ethylene terephthalate) (Mellinex-516 polyester film produced by ICI) of 0.005 inch thickness. Two separate adhesive layers of 0.018 inch thickness poly(ethylene vinyl acetate) (composed of approximately 70% by weight ethylene and approximately 30% by weight of vinyl acetate) were provided adjacent each opposing surface of the poly(ethylene terephthalate) sheet material. Next, two glass sheets of nominal 0.090 inch thickness that had been wiped on a single side with 2% gamma-glycidoxypropyltrimethoxysilane (Union Carbide's A-187) primer in isopropanol solution to a thickness of approximately 500 angstroms were placed against the opposing exposed exterior surface of the two adhesive layers of poly(ethylene vinyl acetate) to form a final assembly of glass, A-187 primer, poly(ethylene vinyl acetate), poly(ethylene terephthalate), poly(ethylene vinyl acetate), A-187 primer and glass.

The aforementioned glass, composite interlayer, glass assembly was then laminated in an air autoclave at a temperature of 295° F. at 225 psi for 25 minutes.

The resulting laminate was tested for impact strength and showed a support height of at least 17 ft. using the 22 lb. ball drop test.

While what has been described is considered to be the more advantageous embodiments of the invention, it will be apparent that modifications an variations can be made in the compositions and specific procedures discussed without departing from the spirit and scope of the present invention, as those skilled in the art will readily understand.

What is claimed is:

1. A laminated glazing unit, comprising sequentially:
   (A) a glass sheet;
   (B) a layer of silane primer;
   (C) a layer of a copolymer of ethylene and vinyl acetate;
   (D) a layer of polyethylene terephthalate having a thickness from about 0.004 to about 0.007 inch;
   (E) a layer of a copolymer of ethylene and vinyl acetate;
   (F) a layer of silane primer; and
   (G) a lass sheet.

2. The laminated glazing unit according to claim 1, wherein the layers of the copolymer of ethylene and vinyl acetate have a thickness from about 0.012 to about 0.018 inch.

3. The laminated glazing unit, according to claim 1, wherein the copolymer of ethylene and vinyl acetate is prepared from about 70% ethylene and 30% vinyl acetate.

4. The laminated glazing unit, according to claim 1, wherein the copolymer of ethylene and vinyl acetate is prepared utilizing a peroxide crosslinking agent.

5. The laminated glazing unit, according to claim 1, wherein the silane primer is selected from the group consisting of gamma-glycidoxypropyltrimethoxysilane, octadecyltriethoxysilane, beta-(3,4-epoxy cyclohexyl) ethyl trimethoxysilane, and 3-methacryloxypropyltrimethoxysilane, and mixtures thereof.

6. The laminated glazing unit, according to claim 1, wherein the adhesion level between the glass sheet and the copolymer of ethylene and vinyl acetate is from about 2 to about 60 pounds per inch.

7. The laminated glazing unit, according to claim 1, wherein the adhesion level between the copolymer of ethylene and vinyl acetate and the polyethylene terephthalate is from about 2 to about 60 pounds per inch.

8. A laminated glazing unit, comprising sequentially:
   (A) a glass sheet;
   (B) a layer of a copolymer of ethylene and vinyl acetate impregnated with a silane primer;
   (C) a layer of polyethylene terephthalate having a thickness from about 0.004 to 0.007 inch;
   (D) a layer of a copolymer of ethylene and vinyl acetate impregnated with a silane primer; and
   (E) a glass sheet.

9. The laminated glazing unit according to claim 8, wherein the layers of the copolymer of ethylene and vinyl acetate have a thickness from about 0.012 to about 0.018 inch.

10. The laminated glazing unit, according to claim 8, wherein the copolymer of ethylene and vinyl acetate is prepared from about 70% ethylene and 30% vinyl acetate.

11. The laminated glazing unit, according to claim 8, wherein the copolymer of ethylene and vinyl acetate is prepared utilizing a peroxide crosslinking agent.

12. The laminated glazing unit, according to claim 8, wherein the silane primer is selected from the group consisting of gamma-glycidoxypropyltrimethoxysilane, octadecyltriethoxysilane, beta-(3,4-epoxy cyclohexyl) ethyl trimethoxysilane, and 3-methacryloxypropyltrimethoxysilane, and mixtures thereof.

13. The laminated glazing unit, according to claim 8, wherein the adhesion level between the glass sheet and the copolymer of ethylene and vinyl acetate is from about 2 to about 60 pounds per inch.

14. The laminated glazing unit, according to claim 8, wherein the adhesion level between the copolymer of ethylene and vinyl acetate and the polyethylene terephthalate is from about 2 to about 60 pounds per inch.

* * * * *

UNITED STATES PATENT AND TRADEMARK OFFICE
CERTIFICATE OF CORRECTION

PATENT NO. : 4,911,984
DATED : March 27, 1990
INVENTOR(S) : Anthony A. Parker

It is certified that error appears in the above-identified patent and that said Letters Patent is hereby corrected as shown below:

Column 1, line 5, change "034,837" to --07/034,837--;

line 39, change "le" to --led--; and line 53, change "no"

to --not--.

Column 5, line 48, change "2" to --24--.

Column 6, line 35, change "interracial" to --interfacial--.

Signed and Sealed this

Twenty-first Day of July, 1992

Attest:

DOUGLAS B. COMER

*Attesting Officer*      *Acting Commissioner of Patents and Trademarks*